United States Patent [19]

Ryan

[11] Patent Number: 4,656,646
[45] Date of Patent: Apr. 7, 1987

[54] SERIAL MINIMUM SHIFT-KEYED MODEM

[75] Inventor: Carl R. Ryan, Gilbert, Ariz.

[73] Assignee: Motorola, Inc., Schaumburg, Ill.

[21] Appl. No.: 846,497

[22] Filed: Mar. 27, 1986

Related U.S. Application Data

[63] Continuation of Ser. No. 619,418, Jun. 11, 1984, abandoned.

[51] Int. Cl.$^4$ ........................................... H04L 27/10
[52] U.S. Cl. ........................................ 375/47; 375/64; 375/90; 332/16 R
[58] Field of Search ................. 375/17, 18, 39, 45, 375/47, 48, 49, 62, 64, 88, 90, 122; 332/16 R

[56] References Cited

U.S. PATENT DOCUMENTS

| | | | |
|---|---|---|---|
| 2,977,417 | 3/1961 | Doelz et al. | 375/47 |
| 3,149,323 | 9/1964 | Aaron et al. | 375/17 |
| 3,674,934 | 7/1972 | Gooding et al. | 375/90 |
| 3,992,617 | 11/1976 | Epstein | 375/90 |
| 3,993,868 | 11/1976 | Balcewicz | 375/47 |
| 4,020,283 | 4/1977 | Epstein | 375/90 |
| 4,028,490 | 6/1977 | Epstein | 375/90 |
| 4,072,905 | 2/1978 | Keelty | 329/122 |
| 4,324,001 | 4/1982 | Rhodes | 375/90 |
| 4,327,439 | 4/1982 | Göckler et al. | 375/53 |
| 4,359,692 | 11/1982 | Ryan | 329/50 |
| 4,438,413 | 3/1984 | Ryan | 375/47 |
| 4,445,094 | 4/1984 | Ryan | 375/120 |
| 4,500,856 | 2/1985 | Childs | 375/47 |
| 4,601,048 | 7/1986 | Ryan | 375/90 |

OTHER PUBLICATIONS

Ryan et al., "760 Mbit/s Serial MSK Microwave Modem", *IEEE Transactions on Communications*, vol. COM-28, No. 5, May 1980.

Li et al., "Digital Modulator for Minimum Shift Keying", *IBM Technical Disclosure Bulletin*, vol. 21, No. 9, Feb. 1979.

*Primary Examiner*—Robert L. Griffin
*Assistant Examiner*—Raymond C. Glenny
*Attorney, Agent, or Firm*—Raymond J. Warren

[57] ABSTRACT

An apparatus and method is disclosed of an SMSK/2 device that provides an additional phase state, and having at least three phase changes possible per bit period, as compared with standard SMSK/2 devices. The additional phase state increases the bit time needed for the signals to remerge which increases the euclidean distance defined by the remergence paths. The increase in euclidean distance provides an improved power efficiency and bit error rate (BER).

15 Claims, 5 Drawing Figures

— PRIOR ART —

SERIAL MINIMUM SHIFT-KEYED MODEM

This application is a continuation of application Ser. No. 619,418, filed 6/11/84, now abandoned.

BACKGROUND OF THE INVENTION

1. Field of the Invention

This invention relates, in general, to the serial minimum shift-keyed transmission concept, and more particularly, to a two bits/Hz serial minimum shift-keyed divide-by-two modem.

2. Description of the Background

Much work has been done in the area of minimum shift-keyed (MSK) and serial MSK (SMSK) transmission areas. A continuing goal in this area is to improve bandwidth efficiency without a corresponding loss in power efficiency.

SUMMARY OF THE INVENTION

Accordingly, it is an object of the present invention to provide an apparatus and method having an additional phase change over the standard SMSK format.

A further object of the present invention is to provide an apparatus and method having an improved power efficiency.

Still another object of the present invention is to provide an apparatus and method having an easy and economical hardware implementation.

The above and other objects and advantages of the present invention are provided by an apparatus and method of improving the bandwidth efficiency by using three phase changes rather than two as is standard in the SMSK format.

A particular embodiment of the present invention comprises an apparatus and method for extending the remergence time from two to three bits, thus allowing for improvement in the power efficiency. This is accomplished by using a dual binary linear phase modulation format. The basic technique utilized, an SMSK/2 modem, is described below and in a copending application, having a Ser. No. 6-596,117 and being assigned to the same assignee, which utilizes a data coder/phase modulator and a phase trajectory converter. This results in a third phase change being available which extends the remergence time.

DETAILED DESCRIPTION OF THE INVENTION

Figure 1:
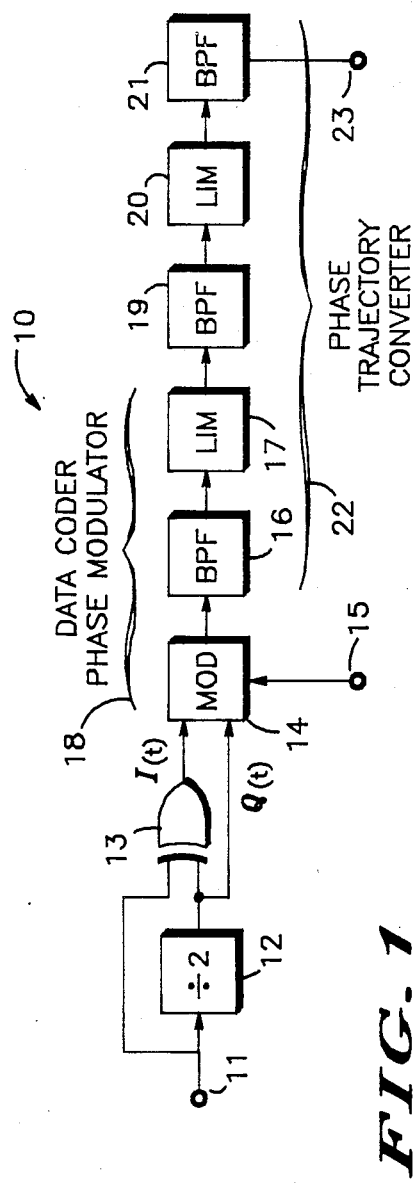
FIG. 1 is a block diagram of an SMSK/2 modulator embodying the present invention.

Referring now to FIG. 1, a block diagram of an SMSK/2 modulator, generally designated 10, embodying the present invention is illustrated. Data is input to modulator 10 at a node 11. The data input type to node 11 is the type commonly known in the art as NRZ or NonReturn to Zero. Node 11 is coupled to the input of a divide-by-two circuit 12 and to one input of a dual input exclusive OR gate 13. Divide-by-two circuit 12 causes the number of transitions of the incoming NRZ signal to be reduced by a factor of two. The output of divide-by-two circuit 12 is coupled to the second input of exclusive OR gate 13 and to the Q input of a modulator 14. The output of exclusive OR gate 13 is coupled to the I input of modulator 14. A reference signal $f_r$ is transmitted to modulator 14 from a node 15. The output from modulator 14 is coupled to a bandpass filter 16. The output from bandpass filter 16 is then coupled to a hard limiter 17. Modulator 14, bandpass filter 16 and hard limiter 17 combine to form a data coder/phase modulator, generally designated 18. Data coder/phase modulator 18 receives the necessary I and Q data inputs from divide-by-two circuit 12 and exclusive OR gate 13 to create a maximum of 90° phase transition steps per bit time. The data that is provided as inputs to I/Q modulator 14 is processed to make the I(t) signal approximate to Hilbert transform of the Q(t) signal, hence the entire unit approximates a single sideband modulator. Hard limiter 17 is coupled to a second bandpass filter 19. Bandpass filter 19 is coupled to a second hard limiter 20 which in turn is coupled to a third bandpass filter 21. Bandpass filters 16, 19 and 21 along with hard limiters 17 and 20 form a phase trajectory converter, generally designated 22. Phase trajectory converter 22 converts the phase steps obtained from I/Q modulator 14 to the phase tree illustrated in FIG. 2 below. Bandpass filter 21 is then coupled to output node 23.

Modulator 10 receives a data signal from node 11 which is acted on by divide-by-two circuit 12 and exclusive OR gate 13 to produce the I and Q inputs to data coder/phase modulator 18. The I and Q signals are received by modulator 14 of data coder/phase modulator 18. Modulator 14, using a reference signal from node 15, produces signals of discrete 90° phase steps. These steps have a maximum of 90° change in phase for each step. These phase steps are transmitted to phase trajectory converter 22 where the phase steps are smoothed to phase ramps. The output of modulator 10 is illustrated in FIG. 2 below.

Figure 2:
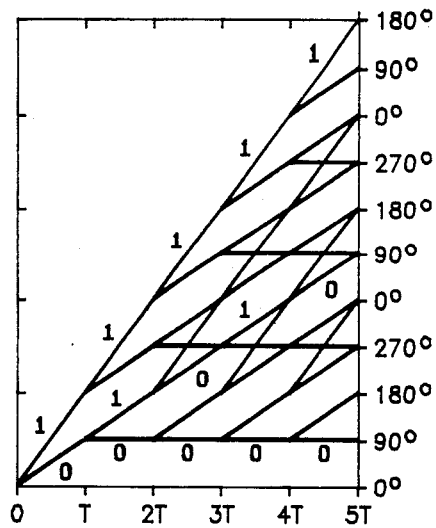
FIG. 2 is a phase tree of the output from the modulator of FIG. 1.

Referring now to FIG. 2 a phase tree of the output of the modulator of FIG. 1 is illustrated showing the various phase states. As is illustrated here the phase is never negative. If a data sequence of all logic ones is provided the phase will increase by 180° each time having either a 0° or 180° phase state. A data sequence of 1010 . . . will result in a constant 90° phase change increase (0°, 90°, 180°, 270°, 0° . . . ). Finally, a sequence of all logic zeros will result in a constant phase state at either 90° or 270°, as illustrated in FIG. 2. Variations of data streams will result in varying slopes of phase change increases as illustrated in FIG. 2.

Figure 2A:
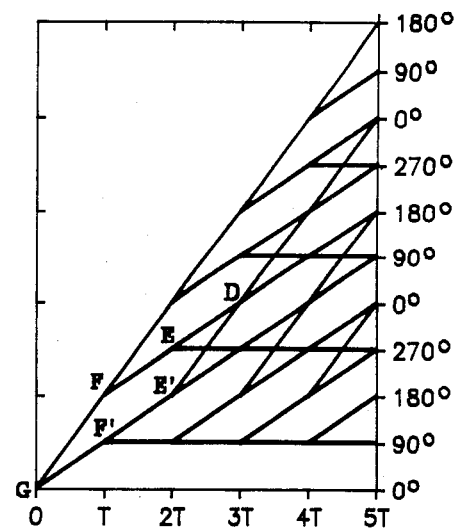
FIG. 2A is the phase tree of FIG. 2 illustrating the euclidian distance.
Figure 3:
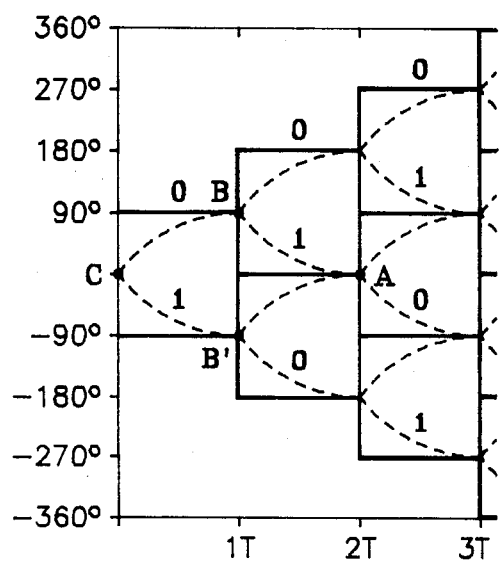
FIG. 3 is a phase tree of a prior art SMSK/2 modulator.

Referring now to FIG. 2A, a phase tree is illustrated for modulator 10, FIG. 1, embodying the present invention. As illustrated by FIG. 2A there are three different phase changes possible 0°, 90°, 180°. Comparing FIG. 2A to FIG. 3 the difference in phase changes may be seen. FIG. 3 is a phase tree of a prior art modulator. As illustrated in FIG. 3 only two possible phase changes exist (+90°, −90°) for the standard SMSK/2 modulator. The bandwidth efficiency of the present invention is obtained through the addition of the additional phase change. The additional phase change acts to extend the remergence time from two to three bits. As illustrated in FIG. 3, to move from point A back to point C two different paths (A-B-C and A-B'-C), taking only two bits to remerge, may be used. Referring to FIG. 2A, the time to move from point D back to G along the two different paths (D-E-F-G and D-E'-F'-G) takes three bits to remerge. Having the additional bit increases the euclidean distance of the three bit remergence as compared to the two bit. The euclidean distance is the area bounded by the two paths taken to remerge. In FIG. 2A the euclidean distance is the area bounded by the lines G-F-E-D-E'-F'-G. In FIG. 3 the euclidean distance is the area bounded by A-B-C-B'-A. The size of these areas will vary for different data rates. However, keeping all of the different parameters constant between the two types of modulators will produce an increased euclidean distance in the present invention. Increasing the euclidean distance improves the bit error rate (BER) of the modulator. Therefore, increasing the euclidean plane in the present invention improves the BER over the prior art.

Figure 4:
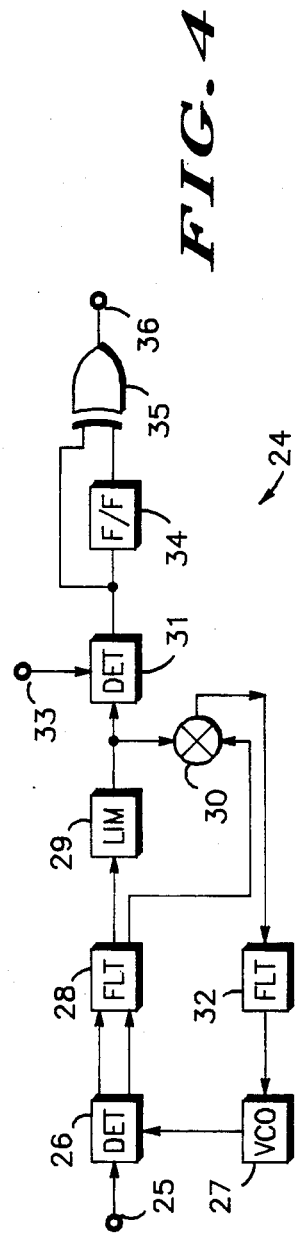
FIG. 4 is a block diagram of an SMSK/2 demodulator embodying the present invention.

Referring now to FIG. 4 a block diagram of an SMSK/2 demodulator, generally designated 24, embodying the present invention is illustrated. Demodulator 24 receives a signal, the signal output from modulator 10, at a node 25. This signal is then transmitted to an I/Q phase detector 26 which receives a signal from a voltage controlled oscillator 27. Phase detector 26 produces dual outputs which are transmitted to a matched filter 28. Matched filter 28 has a dual output, one of which is coupled to a hard limiter 29 and the second of which is coupled to a mixer 30. The output from hard limiter 29 is coupled to a threshold detector 31 and mixer 30. Mixer 30 has an output coupled to a loop filter 32 which is coupled to voltage controlled oscillator 27. Mixer 30, loop filter 32 and voltage controlled oscillator 27 operate as a phase locked loop for demodulator 24. Threshold detector 31 has a data clock input from a node 33 which regulates the sample time. Threshold detector 31 is coupled to a flip flop 34 and an input of a dual input exclusive OR gate 35. The output from flip flop 34 is coupled to the second input of exclusive OR gate 35. Exclusive OR gate 35 produces an output which is coupled to a node 36. This output is the same as the data input to node 11 of modulator 10, FIG. 1.

When a signal is received by demodulator 24 it is transmitted to I/Q phase detector 26 and then to matched filter 28, which is designed to optimize the circuit by providing the maximum signal-to-noise ratio. One signal is then used for the phase locked loop while the other is transmitted to a hard limiter which produces a one or zero output. This signal is then transmitted to threshold detector 31 which is set to take a sample at the maximum eye opening of the signal. Flip flop 34 is then triggered by the signal and controls the timing of the output through exclusive OR gate 35 to node 36.

Thus, it is apparent that there has been provided, in accordance with the invention, a device and method that fully satisfies the objects, aims, and advantages set forth above.

It has been shown that the present invention provides an SMSK/2 modem that has an additional phase change which results in an increased remergence time providing an improved power efficiency. It has also been shown that the present invention has a simple hardware design that is economical to implement.

MSK, or minimum shift keyed modems are well defined in the art. In addition, SMSK is a MSK modem transmitting and receiving modulated serial signals. This can be seen in a U.S. Pat. No. 4,445,094, U.S. Pat. No. 4,438,413, U.S. Pat. No. 4,601,048, and in the article "760 Mbit/s Serial MSK Microwave Modem" by R. C. Ryan et al., IEEE Transactions on Communications, Vol. COM-28, No. 5 (May 1980). Further, SMSK/2 has been defined in the pending application to be an SMSK modem that has the incoming data signal, such as an NRZ signal, divided-by-two. Therefore, for the purpose of the following claims, SMSK/2, or Serial Minimum Shift Keyed Divide-by-Two, modem shall be defined as a modem that divides the incoming serial bit stream data signal by two and that transmits and receives a modulated minimum shift keyed (MSK) serial signal.

While the invention has been described in conjunction with specific embodiments thereof, it is evident that many alterations, modifications, and variations will be apparent to those skilled in the art in light of the foregoing description. Accordingly, it is intended to embrace all such alternatives, modifications, and variations as fall within the spirit and broad scope of the appended claims.

I claim:

1. Serial minimum shift keyed divide-by-two (SMSK/2) modem, wherein said SMSK/2 modem is defined as dividing an incoming serial bit stream data signal by two and transmitting and receiving a modulated minimum shift keyed (MSK) serial signal, said SMSK/2 modem comprising:
   SMSK/2 modulator means having at least three phase changes possible per bit period; and
   SMSK/2 demodulator means for demodulating said modulated signal.

2. The SMSK/2 device of claim 1 wherein said SMSK/2 modulator means comprises:
   a divide-by-2 circuit having an input and an output said input being coupled to receive said data signal;
   a first logic gate having a first input, a second input and an output, said first input being coupled to receive said data signal and said second input being coupled to said output of said divide-by-2 circuit;
   an I/Q modulator having a first input, a second input, a third input and an output, said first input being coupled to said output of said first logic gate, said second input being coupled to said output of said divide-by-2 circuit, said third input being coupled to receive a reference signal and said I/Q modulator providing a signal having phase changes; and
   phase trajectory converter means for converting said phase changes of said signal provided from said I/Q modulator, said phase trajectory converter means having an input and an output, said input being coupled to said output of said I/Q modulator and said output being coupled to an output of said SMSK/2 modulator means.

3. The SMSK/2 device of claim 2 wherein said phase trajectory converter means comprises:
   a first bandpass filter having an input and an output said input being coupled to said output of said I/Q modulator;
   a first hard limiter having an input and an output, said input being coupled to said output of said first bandpass filter;
   a second bandpass filter having an input and an output said input being coupled to said output of said first hard limiter;
   a second hard limiter having an input and an output, said input being coupled to said output of said second bandpass filter; and
   a third bandpass filter having an input and an output, said input being coupled to said output of said second hard limiter and said output being coupled to said output of said SMSK/2 modulator.

4. The SMSK/2 device of claim 3 wherein said SMSK/2 demodulator comprises;
   an I/Q phase detector having a first input, a second input, a first output and a second output said first input being coupled to receive a signal from said output of said SMSK/2 modulator;
   a matched filter having a first input, a second input, a first output, and a second output, said first input being coupled to said first output of said I/Q phase detector and said second input being coupled to said second output of said I/Q phase detector;
   a hard limiter having an input and an output, said input being coupled to said first output of said matched filter;
   a mixer having a first input, a second input and an output said first input being coupled to said output of said hard limiter and said second input being coupled to said second output of said matched filter;
   a loop filter having an input and an output, said input being coupled to said output of said mixer;
   a voltage controlled oscillator having an input and an output said input being coupled to said output of said loop filter and said output being coupled to said second input of said I/Q phase detector;
   a threshold detector having a first input, a second input and an output, said first input being coupled to said output of said hard limiter and said second input being coupled to receive a data clock signal;
   a flip flop having an input and an output said input being coupled to said output of said threshold detector; and
   a second logic gate having a first input, a second input and an output said first input being coupled to said output of said threshold detector, said second input being coupled to said output of said flip flop and said output being coupled to an output of said SMSK/2 demodulator.

5. The SMSK/2 device of claim 1 wherein said SMSK/2 modulator means comprises:
   a divide-by-2 circuit having an input and an output said input being coupled to receive said data signal;
   a first logic gate having a first input, a second input and an output, said first input being coupled to receive said data signal and said second input being coupled to said output of said divide-by-2 circuit;
   data coder/phase modulator means for creating phase changes per bit time, said data coder/phase modulator having a first input, a second input, a third input and an output, said first input being coupled to said output of said first logic gate, said second input being coupled to said output of said divide-by-2 circuit and said third input being coupled to receive a reference signal;
   a second bandpass filter having an input and an output, said input being coupled to said output of said data coder/phase modulator means;
   a second hard limiter having an input and an output, said input being coupled to said output of said second bandpass filter; and
   a third bandpass filter having an input and an output said input being coupled to said output of said second hard limiter and said output being coupled to said output of said SMSK/2 modulator.

6. The SMSK/2 device of claim 5 wherein said data coder/phase modulator means comprises:
   an I/Q modulator having a first input, a second input, a third input and an output, said first input being coupled to said first input of said data coder/phase modulator, said second input being coupled to said second input of said data coder/phase modulator and said third input being coupled to said third input of said data coder/phase modulator;
   a first bandpass filter having an input and an output, said input being coupled to said output of said I/Q modulator; and
   a first hard limiter having an input and an output, said input being coupled to said output of said first bandpass filter and said output being coupled to said output of said data coder/phase modulator means.

7. The SMSK/2 device of claim 6 wherein said SMSK/2 demodulator comprises:
   an I/Q phase detector having a first input, a second input, a first output and a second output said first input being coupled to receive a signal from said output of said SMSK/2 modulator;
   a matched filter having a first input, a second input, a first output, and a second output, said first input being coupled to said first output of said I/Q phase detector and said second input being coupled to said second output of said I/Q phase detector;
   a hard limiter having an input and an output, said input being coupled to said first output of said matched filter;
   a mixer having a first input, a second input and an output said first input being coupled to said output of said hard limiter and said second input being coupled to said second output of said matched filter;
   a loop filter having an input and an output, said input being coupled to said output of said mixer;
   a voltage controlled oscillator having an input and an output said input being coupled to said output of said loop filter and said output being coupled to said second input of said I/Q phase detector;
   a threshold detector having a first input, a second input and an output, said first input being coupled to said output of said hard limiter and said second input being coupled to receive a data clock signal;
   a flip flop having an input and an output said input being coupled to said output of said threshold detector; and
   a second logic gate having a first input, a second input and an output said first input being coupled to said output of said threshold detector, said second input being coupled to said output of said flip flop and said output being coupled to an output of said SMSK/N demodulator.

8. The SMSK/2 device of claim 7 wherein said divide-by-2 circuit is comprised of a flip flop circuit.

9. The SMSK/2 device of claim 8 wherein said first and second logic gates are comprised of dual input exclusive OR gates.

10. A method of producing a serial minimum shift keyed divide-by-two (SMSK/2) data signal, having at least three phase changes possible per bit period, said method comprising the steps of:
   providing a data signal;
   dividing said data signal by 2 producing a divided data signal;
   combining said data signal with said divided data signal, producing a combined data signal;

modulating said combined data signal with said divided data signal using a reference signal, producing a modulated signal having 90° phase steps producing 90° phase ramps.

11. The method of claim 10 wherein said smoothing step comprises the steps of:
  filtering said modulated signal with a first bandpass filter;
  limiting said signal with a first hard limiter;
  filtering said signal with a second bandpass filter;
  limiting said signal with a second hard limiter; and
  filtering said signal with a third bandpass filter producing a modulated signal.

12. The method of claim 11 further comprising the step of demodulating said modulated signal.

13. The method of claim 12 wherein said step of demodulating comprises the steps of:
  detecting said signal with an I/Q detector;
  filtering said signal with a matched filter;
  limiting said signal using a hard limiter;
  detecting said signal with a threshold detector; and
  timing the output of said signal using a flip flop in series with a logic gate.

14. Serial Minimum shift keyed divide-by-two (SMSK/2) modem having at least three phase changes, comprising:
  a divide-by-2 circuit having an input and an output, said input being coupled to receive a data signal;
  a first logic gate having a first input, a second input and an output, said first input being coupled to receive said data signal and said second input being coupled to said output of said divide-by-2 circuit;
  an I/Q modulator having a first input, a second input, a third input and an output, said first input being coupled to said output of said first logic gate, said second input being coupled to said output of said divide-by-2 circuit and said third input being coupled to receive a reference signal;
  a first bandpass filter having an input and an output said input being coupled to said output of said I/Q modulator;
  a first hard limiter having an input and an output said input being coupled to said output of said first bandpass filter;
  a second bandpass filter having an input and an output said input being coupled to said output of said first hard limiter;
  a second hard limiter having an input and an output, said input being coupled to said output of said second bandpass filter;
  a third bandpass filter having an input and an output, said input being coupled to said output of said second hard limiter;
  transmitting means for transmitting a signal received from said third bandpass filter, said transmitting means having an input being coupled to said output of said third bandpass filter;
  receiving means for receiving said signal from said transmitting means, said receiving means having an output;
  an I/Q phase detector having a first input, a second input, a first output and a second output, said first input being coupled to said output of said receiving means;
  a matched filter having a first input, a second input, a first output and a second output, said first input being coupled to said first output of said I/Q phase detector and said second input being coupled to said second output of said I/Q phase detector;
  a third hard limiter having an input and an output, said input being coupled to said first output of said matched filter;
  a mixer having a first input, a second input and an output, said first input being coupled to said output of said hard limiter and said second input being coupled to said second output of said matched filter;
  a loop filter having an input and an output, said input being coupled to said output of said mixer;
  a voltage controlled oscillator having an input and an output, said input being coupled to said output of said loop filter and said output being coupled to said second input of said I/Q phase detector;
  a threshold detector having a first input, a second input and an output, said first input being coupled to said output of said third hard limiter and said second input being coupled to receive a data clock signal;
  a flip flop having an input and an output said input being coupled to said output of said threshold detector; and
  a second logic gate having a first input, a second input and an output, said first input being coupled to said output of said threshold detector, said second input being coupled to said output of said flip flop and said output being coupled to an output of said SMSK/2 modem.

15. The SMSK/2 device of claim 15 wherein said first and second logic gates are comprised of dual input exclusive OR gates.

* * * * *